United States Patent
Harald

(10) Patent No.: US 7,385,979 B2
(45) Date of Patent: Jun. 10, 2008

(54) NETWORK-UNIT, AND TELECOMMUNICATION NETWORK, AND METHOD

(75) Inventor: Eckhardt Harald, Stuttgart (DE)

(73) Assignee: Alcatel, Paris (FR)

( * ) Notice: Subject to any disclaimer, the term of this patent is extended or adjusted under 35 U.S.C. 154(b) by 904 days.

(21) Appl. No.: 10/084,217

(22) Filed: Feb. 28, 2002

(65) Prior Publication Data

US 2002/0136215 A1    Sep. 26, 2002

(30) Foreign Application Priority Data

Mar. 22, 2001   (EP) ................... 01440082

(51) Int. Cl.
*H04L 12/28* (2006.01)
*H04L 12/56* (2006.01)

(52) U.S. Cl. .............. 370/392; 370/386; 370/401

(58) Field of Classification Search .......... 370/351, 370/356, 386, 389, 392, 395.31, 395.52, 370/401

See application file for complete search history.

(56) References Cited

U.S. PATENT DOCUMENTS

| | | | |
|---|---|---|---|
| 6,021,263 A * | 2/2000 | Kujoory et al. | 709/232 |
| 6,185,213 B1 * | 2/2001 | Katsube et al. | 370/397 |
| 6,188,689 B1 * | 2/2001 | Katsube et al. | 370/389 |
| 6,389,023 B1 * | 5/2002 | Matsuzawa et al. | 370/395.31 |
| 7,136,382 B1 * | 11/2006 | Sharma et al. | 370/392 |
| 2003/0067929 A1 * | 4/2003 | Matsuzawa | 370/401 |
| 2004/0071135 A1 * | 4/2004 | Jimmei et al. | 370/386 |

FOREIGN PATENT DOCUMENTS

| | | |
|---|---|---|
| EP | 0871309 A2 | 10/1998 |
| EP | 1001577 A1 | 5/2000 |
| WO | WO 00/48374 A1 | 8/2000 |

* cited by examiner

*Primary Examiner*—Wing Chan
*Assistant Examiner*—Saba Tsegaye
(74) *Attorney, Agent, or Firm*—Sughrue Mion, PLLC

(57) ABSTRACT

Known network-units like Base Stations or Node B's receive signals including first packet fields which are directly analyzable (layer 2) and second packet fields which are not analyzable (layer 3) until they have been processed (defragmentation, decompression, demultiplexing, routing table consultation). To deal with these signals, the network-units analyze first information originating from the first fields, process second information originating from the second fields and analyze the processed second information. In case this processed second information indicates that the signal is destined for a next network-unit, possibly after a further processing, the signal is sent to the next network-unit. Although the first field is a non-address field (quality field), by introducing a kind of routing info into the first information, and making the processing of the second information dependent upon an analysis of the first (now kind of routing) information, the network-unit becomes more efficient by avoiding unnecessary processing.

12 Claims, 2 Drawing Sheets

NETWORK-UNIT, AND TELECOMMUNICATION NETWORK, AND METHOD

The invention is based on a priority application EP 01 440 082.4 which is hereby incorporated by reference.

BACKGROUND OF THE INVENTION

The invention relates to a network-unit for use in a telecommunication network and comprising
- at least one input for receiving a signal comprising a first field which is directly analysable and a second field which is analysable after a processing,
- a first analyser coupled to said at least one input for analysing first information originating from said first field,
- a processor for performing said processing of second information originating from said second field, and
- a second analyser coupled to said processor for analysing processed second information,
- at least one output for sending a further signal to a further network-unit and comprising a third field which is directly analysable and a fourth field which is analysable after a processing in said further network-unit Such a network-unit is known in the form of a Base Station or Node B in a mobile telecommunication network. The first field is for example a so-called layer 2 header which can be analysed directly. The second field is for example a so-called layer 3 header which cannot be analysed until some processing has taken place (like for example defragmentation, decompression, demultiplexing and/or routing table consultation). To deal with this kind of signals, the network-unit analyses the first information originating from the first field, then processes the second information originating from the second field, and then analyses the processed second information. In case this processed second information (for example comprising routing information) indicates that the signal is destined for a next network-unit, possibly after further processing (like for example multiplexing and/or compression and/or fragmentation), the signal is sent to the next network-unit.

Such a network-unit is disadvantageous, inter alia, due to sometimes unnecessarily performing said processing.

SUMMARY OF THE INVENTION

It is an object of the invention, inter alia, to provide a network-unit as described in the preamble, which is more efficient.

According to the network-unit of the invention the first analyser is coupled to said processor for, in dependence of an analysis result of said first information, at least selecting at least one output and switching at least a part of said signal to said selected output or performing said processing, with said first information comprising non-address information, and with said second information comprising address information defining further network-units.

By introducing, into the first information, an indication about the second information being relevant or not to this network-unit (although said first information comprises non-address information, and said second information comprises address information defining further network-units), and by analysing this indication and in dependence at least either selecting an output and switching (routing) at least part of said signal to the selected output, or performing said processing of the second information, the network-unit becomes more efficient by taking into account the relevancy of the second information and possibly avoiding unnecessary processing (like for example defragmentation, demultiplexing, decompression and/or routing table consultation).

The invention is based on the insight, inter alia, that, when distinguishing between higher and lower layers, parts of functionalities can be performed by different layers, with a different complexity per layer.

The invention solves the problems identified above, inter alia, and provides a network-unit which is more efficient.

According to a first embodiment of the network-unit of the invention the network-unit further comprises
- a first generator coupled to said at least one output for generating said third information, and
- a second generator coupled to said at least one output for generating said fourth information.

By introducing said first and second generator, the network-unit has got extended switching functions. Of course, for example said third information may be generated in response to and/or in dependence of said fourth information, and vice versa, and for example said third and fourth information may (partly) contain old information already there and/or new information to be calculated etc.

It should be noted that each one of said analysers, processors and generators in said network-unit is either 100% hardware, 100% software or a mixture of both. Thereto, said network-unit comprises one or more (like for example hundreds or thousands) processors. So, said analysers, processors and generators, respectively, should be considered to be analysing-, processing- and generation-functions, respectively.

According to a second embodiment of the network-unit of the invention the first field comprises a quality field for indicating a quality, with said second field comprising an IP-address field for indicating an IP-address.

In this case a quality definition and an indication function have been combined, thereby allowing for example four bits to be used for sixteen possibilities. Such a quality field is known itself from for example multiclass PPP.

According to a third embodiment of the network-unit of the invention the processing corresponds with defragmentation, decompression, demultiplexing and/or table consultation.

In this case a further processing may correspond with multiplexing, compression and/or fragmentation. Said multiplexing will be done in case of many small packets, and said fragmentation will be done to distribute the fragments over multiple links, or to fragment packets to smaller ones to avoid line blocking effects for other packets with higher priority. The further processing may further comprise the selecting of the right output (by for example using a table), the distribution/transferral to this output, the choosing of an output for load balancing reasons if many go into the same direction, and the making of queues according to a required quality of service class (quality hereby including priority calculation and fairness calculation).

The invention further relates to a telecommunication network comprising several network-units, at least a first network-unit comprising- at least one input for receiving a signal comprising a first field which is directly analysable and a second field which is analysable after a processing,
- a first analyser coupled to said at least one input for analysing first information originating from said first field,
- a processor for performing said processing of second information originating from said second field, and a second analyser coupled to said processor for analysing processed second information, at least one output for sending a further signal to a second network-unit and comprising a third field which is directly analysable and a fourth field which is analysable after a processing in said second network-unit.

According to the telecommunication network of the invention the first analyser is coupled to said processor for, in dependence of an analysis result of said first information, at least selecting at least one output and switching at least a part of said signal to said selected output or performing said processing, with said first information comprising non-address information, and with said second information comprising address information defining said second network-unit.

According to a first embodiment of the telecommunication network of the invention the first network-unit further comprises a first generator coupled to said at least one output for generating said third information, and a second generator coupled to said at least one output for generating said fourth information.

Further embodiments of the telecommunication network according to the invention correspond with embodiments of the network-unit according to the invention.

The invention yet further relates to a method for dealing with signals and comprising the steps of receiving a signal comprising a first field which is directly analysable and a second field which is analysable after a processing, analysing first information originating from said first field, performing said processing of second information originating from said second field, and analysing processed second information, sending a further signal to a further network-unit and comprising a third field which is directly analysable and a fourth field which is analysable after a processing in said further network-unit.

The method according to the invention further comprises the steps of, in dependence of an analysis result of said first information, at least selecting at least one output and switching at least a part of said signal to said selected output or performing said processing, with said first information comprising non-address information, and with said second information comprising address information defining further network-units.

A first embodiment of the method according to the invention comprises the steps of generating said third information, and generating said fourth information.

According to a second embodiment of the method of the invention the first field comprises a quality field for indicating a quality, with said second field comprising an IP-address field for indicating an IP-address.

According to a third embodiment of the method of the invention the processing corresponds with defragmentation, decompression, demultiplexing and/or table consultation.

BRIEF DESCRIPTION OF THE DRAWING

The invention will be further explained at the hand of an embodiment described with respect to drawings, whereby FIG. 1 discloses a network-unit according to the invention for use in a telecommunication network according to the invention, FIG. 2 discloses a schematic overview of functions in a network-unit according to the invention, FIG. 3 discloses a telecommunication network according to the invention, and FIG. 4 discloses a signal to be received and to be dealt with by a network-unit according to the invention.

DESCRIPTION OF A PREFERRED EMBODIMENT

Figure 1:
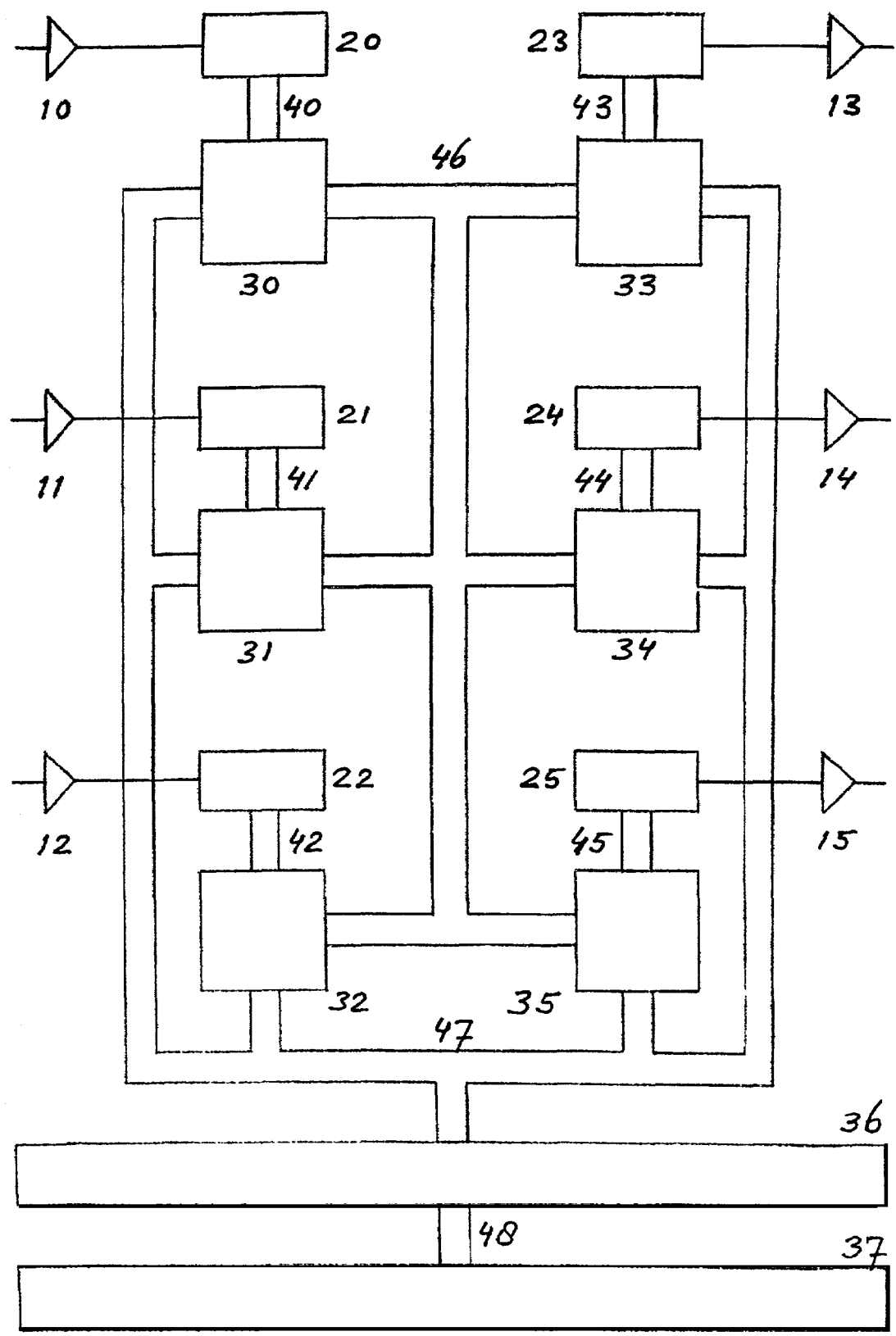

The network-unit according to the invention as shown in FIG. 1 comprises a Translator (Signal To Bit Translator) 10, of which an input forms a first input of the network-unit and of which an output is coupled to an input of buffer 20. An in/output of buffer 20 is coupled via a bus 40 to a first in/output of a processor 30, of which a second in/output is coupled to a bus 46 and of which a third in/output is coupled to a bus 47. The network-unit shown in FIG. 1 further comprises a Translator (Signal To Bit Translator) 11, of which an input forms a second input of the network-unit and of which an output is coupled to an input of buffer 21. An in/output of buffer 21 is coupled via a bus 41 to a first in/output of a processor 31, of which a second in/output is coupled to a bus 46 and of which a third in/output is coupled to a bus 47. The network-unit shown in FIG. 1 further comprises a Translator (Signal To Bit Translator) 12, of which an input forms a third input of the network-unit and of which an output is coupled to an input of buffer 22. An in/output of buffer 22 is coupled via a bus 42 to a first in/output of a processor 32, of which a second in/output is coupled to a bus 46 and of which a third in/output is coupled to a bus 47. The network-unit shown in FIG. 1 further comprises a Translator (Bit to Signal Translator) 13, of which an output forms a first output of the network-unit and of which an input is coupled to an output of buffer 23. An in/output of buffer 23 is coupled via a bus 43 to a first in/output of a processor 33, of which a second in/output is coupled to a bus 46 and of which a third in/output is coupled to a bus 47. The network-unit shown in FIG. 1 further comprises a Translator (Bit to Signal Translator) 14, of which an output forms a second output of the network-unit and of which an input is coupled to an output of buffer 24. An in/output of buffer 24 is coupled via a bus 44 to a first in/output of a processor 34, of which a second in/output is coupled to a bus 46 and of which a third in/output is coupled to a bus 47. The network-unit shown in FIG. 1 further comprises a Translator (Bit to Signal Translator) 15, of which an output forms a third output of the network-unit and of which an input is coupled to an output of buffer 25. An in/output of buffer 25 is coupled via a bus 45 to a first in/output of a processor 35, of which a second in/output is coupled to a bus 46 and of which a third in/output is coupled to a bus 47. So, bus 46 interconnects processors 30-35. Bus 47 couples processors 30-35 with a first in/output of a processor 36, of which a second in/output is coupled via a bus 48 with an in/output of a processor 37.

Figure 2:
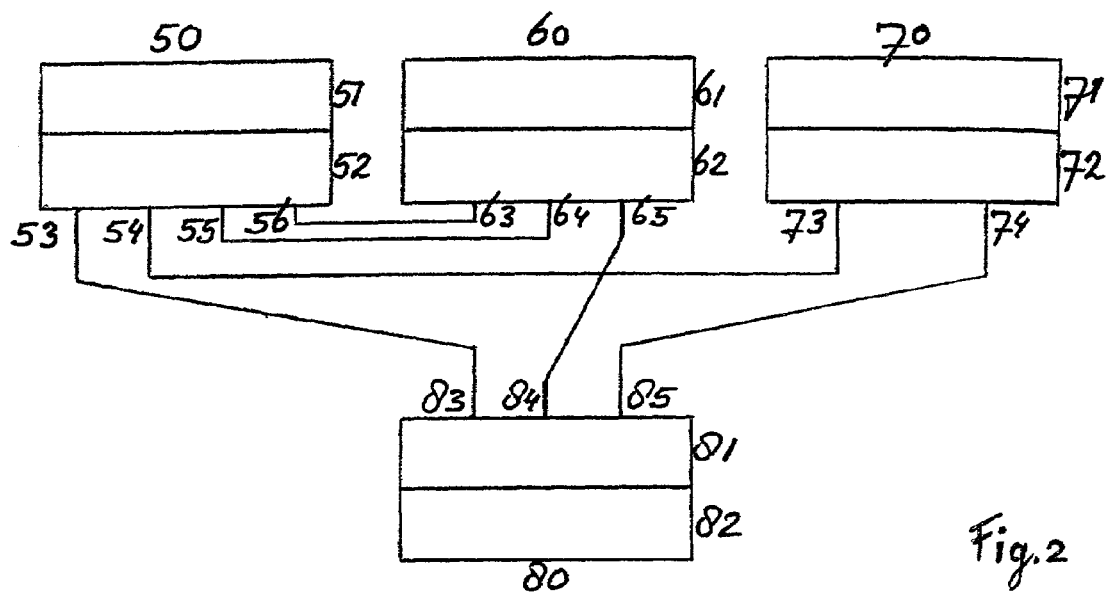

The schematic overview of functions in a network-unit A according to the invention as shown in FIG. 2 discloses parts 50, 60 and 70 respectively, each part comprising a first subpart 51, 61 and 71 respectively for physical connection (layer 1) to another network-unit B, C and D respectively, and comprising a second subpart 52, 62 and 72 respectively for direct detection (lower layer 2), and discloses a part 80 comprising a first subpart 81 for direct detection (higher layer 2) and comprising a second subpart 82 for processing/further processing (layer 3) and for detection after processing. Between subpart 52 and 81 there is a coupling 53, 83 illustrating a message originating from network-unit B linked to subpart 51 being detected directly (subpart 52) and then being deconverted (subpart 82) in network-unit A. Between subpart 52 and 72 there is a coupling 54, 73 illustrating a message originating from network-unit B linked to subpart 51 not being deconverted but just being detected directly (subpart 52) and then being sent to network-unit D linked to subpart 71. Between subpart 52 and 62 there is a coupling 55, 64 illustrating a message originating from network-unit B linked to subpart 51 not being deconverted but just being detected directly (subpart 52) and then being sent to network-unit C linked to subpart 61. Between subpart 52 and 62 there is a coupling 56, 63 illustrating a message originating from network-unit B linked to subpart 51 not being deconverted but just being detected directly (subpart 52) and then being sent to network-unit E via network-unit C linked to subpart 61. Between subpart 62 and 81 there is a coupling 65, 84 illustrating a message originating from network-unit C linked to subpart 61 being detected directly (subpart 62) and then being deconverted (subpart 82) in network-unit A. Between subpart 72 and 81 there is a coupling 74, 85 illustrating a message originating from network-unit D linked to subpart 71 being detected directly (subpart 72) and then being deconverted (subpart 82) in network-unit A, etc. and vice versa etc.

Figure 3:
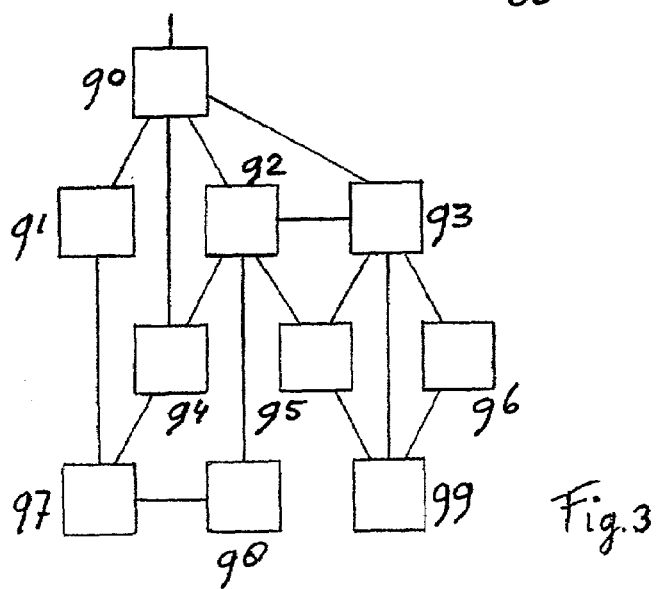

The telecommunication network according to the invention as shown in FIG. 3 discloses ten network-units, a network-unit 90 linked to network-units 91, 92, 93 and 94, network-unit 91 further being linked to a network-unit 97, network-unit 92 further being linked to network-units 93, 94, 95 and 98, network-unit 93 further being linked to network-units 95, 96 and 99, network-unit 94 further being linked to network-unit 97, network-unit 95 further being linked to network-unit 99, network-unit 96 further being linked to network-unit 99, network-unit 97 further being linked to network-unit 98.

Figure 4:
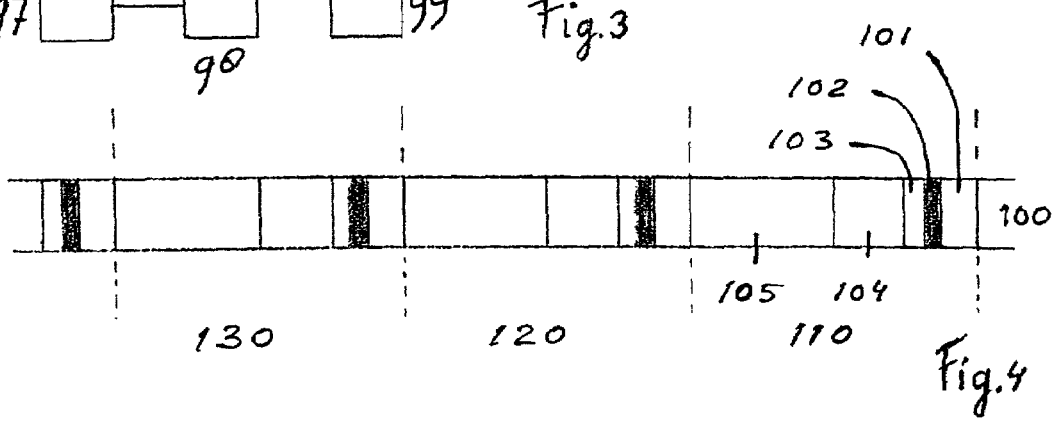

The signal 100 as shown in FIG. 4 and to be received and to be dealt with by a network-unit according to the invention comprises packets 110, 120 and 130, inter alia. Packet 110 comprises a first field being a layer 2 header consisting of subfield 101, subfield 102 and subfield 103, and comprises a second field being a layer 3 header 104 consisting of one or more further subfields and comprises a data part 105, with said layer 3 header and data part sometimes being in a processed form.

The network-unit as shown in FIG. 1 in view of FIG. 4 functions according to prior art solutions as follows. A signal, comprising one or more packets with each packet comprising at least a first field comprising first information being a layer 2 header consisting of subfields 101, 102 and 103, and a second field comprising second information being a layer 3 header consisting of further subfields, and a data part, arrives for example at the input of Translator 10, which translates the signal into a stream of bits. These bits are (temporarily) stored in buffer 20, with processor 30 via bus 40 detecting these bits, thereby establishing borderlines between packets (delineation) and establishing for each packet the first field being the layer 2 header. Processor 30 analyses this layer 2 header, and sometimes cannot detect the rest (layer 3 header+data part) of each packet, due to this rest being in a processed form. This rest is supplied via bus 40 and processor 30 and bus 47 to processor 36, which processes at least the layer 3 header. After processing, processor 36 is able to analyze the layer 3 header, comprising an IP address for example.

In a first prior art case of this IP address defining another network-unit, the layer 3 header is further processed, and together with the data part (still processed) for example via bus 47 supplied to processor 33, which via bus 47 further receives a new layer 2 header from processor 36. Processor 33 combines both into a stream of bits and supplies this stream via bus 43 to buffer 23, after which the stream of bits is sent to said another network-unit via Translator 13 which translates the stream of bits into a signal.

In a second prior art case of this IP address defining this network-unit, the data part (still processed) is supplied via bus 48 to processor 37, which processes this data part, after which the data can be used.

Of course, mixtures of both said first and second cases can be combined. Independently of that, the processing always takes place, due to analysis of the layer 3 header being necessary to establish the destination. However, to establish that a packet is not destined for this network-unit, the processing and further processing are time-consuming procedures which should be avoided.

Thereto, according to the invention, into the first information being the layer 2 header, an indication about the second information (the layer 3 header being relevant or not to this network-unit) is introduced, for example by using a part of the subfield 102 which according to prior art is used entirely for indicating a quality. By using it at least partly for indicating a destination for this packet, like for example using four bits for sixteen possibilities, thereby using some of the sixteen possibilities that are offered by four bits, for addressing purposes, and by detecting this indication in processor 30 and in dependence at least selecting at least one output and switching at least a part of said signal to said selected output or performing said processing of the second information being the layer 3 header in processor 36, the network-unit according to the invention has become more efficient by taking into account the relevancy of the second information being the layer 3 header and possibly avoiding unnecessary processing and further processing respectively (like for example defragmentation and/or decompression and/or demultiplexing and/or routing table consultation and/or multiplexing and/or compression and/or fragmentation respectively).

Alternatively, said indication may be transferred to and detected by processor 33, 34 or 35, after which said processing of second information may take place or not, etc.

In view of FIG. 2, according to the invention, network-unit A as shown in and described at the hand of FIG. 1 comprises a part 50 comprising a first subpart 51 (for example at least partly corresponding with Translator 10) for physical connection (layer 1) to another network-unit B and comprising a second subpart 52 (for example at least partly corresponding with processor 30) for direct detection (lower layer 2), and comprises a part 60 comprising a first subpart 61 (for example at least partly corresponding with Translator 13) for physical connection (layer 1) to another network-unit C and comprising a second subpart 62 (for example at least partly corresponding with processor 33) for combination purposes (lower layer 2), and comprises a part 80 comprising a first subpart 81 (for example at least partly corresponding with processors 30 and 33) for direct detection and combination purposes (higher layer 2) and comprising a second subpart 82 (for example at least partly corresponding with processor 36) for processing/further processing (layer 3) and for detection after processing. Between subpart 52 and 81 there is a coupling 53, 83 illustrating a message (stream of bits) originating from network-unit B linked to subpart 51 being detected directly (subpart 52) and then being processed (subpart 82) in network-unit A. Between subpart 52 and 62 there is a coupling 55, 64 illustrating a message (stream of bits) originating from network-unit B linked to subpart 51 not being processed but just being detected directly (subpart 52) and then being sent to subpart 62 and to network-unit C linked to subpart 61. Between subpart 62 and 81 there is a coupling 65, 84 illustrating a message (stream of bits) being processed (subpart 82) and then being sent to subpart 62 and to network-unit C linked to subpart 61.

In view of FIG. 3, according to the invention, the network-unit as shown in and described at the hand of FIG. 1 for example corresponds with network-unit 92, with the telecommunication system according to the invention as shown in FIG. 3 disclosing ten network-units 90-99. Thereby it should be observed that where network-unit 92 comprises five in/outputs (inputs and/or outputs), the network-unit as shown in FIG. 1 comprises three inputs and three outputs.

So, in FIG. 1, said at least one input of the network-unit according to the invention corresponds at least partly with an input of Translator 10, for receiving a signal comprising a first field which is directly analysable and a second field which is analysable after a processing. At least one first analyser coupled to said at least one input for analysing first information originating from said first field corresponds at least partly with buffer 20 and/or processor 30. A processor for performing said processing of second information originating from said second field corresponds at least partly with processor 30 and/or 36, and at least one second analyser coupled to said processor for analysing processed second information corresponds at least partly with processor 36. At least one output for sending a further signal to a further network-unit and comprising a third field which is directly analysable and a fourth field which is analysable after a processing in said further network-unit corresponds with an output of Translator 13. According to the invention, said processor (corresponding with processors 30 and/or 36) is coupled to said first analyser for, in dependence of an analysis result of said first information, at least selecting at least one output and switching at least a part of said signal to said selected output (by taking for example the content of field 102 and using a table to find the right output) or performing said processing, with said first information comprising non-address information, and with said second information comprising address information defining further network-units. At least one first generator coupled to said at least one output for generating third information destined for said third field corresponds at least partly with processor 33 and/or 36. A further processor for performing a further processing corresponds at least partly with processor 33 and/or 36, and at least one second generator coupled to said further processor for generating said fourth information corresponds at least partly with processor 33 and/or 36. Such a network-unit has got extended switching functions. It should be noted that each one of said analysers, processors and generators in said network-unit is either 100% hardware, 100% software or a mixture of both. So, said analysers, processors and generators, respectively, should be considered to be analysing-, processing- and generation-functions, respectively.

Said processing may correspond with defragmentation, decompression, demultiplexing and/or routing table consultation, and the further processing may correspond with multiplexing, compression and/or fragmentation. In case of a signal arriving at an input of Translator 10 being fragmented itself, due to different parts of the layer 3 header being situated in different packets, the layer 2 header comprises near quality field 102 another subfield 101 or 103, for indicating that said signal has been fragmented. This is detected by processor 30, and in response defragmentation takes place in processor 30 and/or 36. In case of signals arriving at inputs of Translators 10, 11 and/or 12 being fragmented, due to different parts of the layer 3 header being situated in different packets of different signals, each relevant layer 2 header comprises near quality field 102 another subfield 101 or 103, for indicating that the relevant signal has been fragmented. This is detected by processors 30, 31 and/or 32, and in response defragmentation takes place in processor 36. In case of one or more signals being compressed, an similar situation occurs. Routing table consultation will generally take place via processor 36, and multiplexing and compression and fragmentation will generally be performed similarly to said defragmentation and decompression, but now via processors 36, 35, 34 and/or 33 etc. In view of this processing corresponding with defragmentation, decompression, demultiplexing and/or routing table consultation, and the further processing corresponding with multiplexing, compression and/or fragmentation, it will be clear that the use of the quality field for indicating whether the second information is relevant to this network-unit or not (more generally that the processing is made dependent upon the detection of first information) will make the network-unit more efficient.

All embodiments are just embodiments and do not exclude other embodiments not shown and/or described. All alternatives are just alternatives and do not exclude other alternatives not shown and/or described. The expression "and/or" corresponds with "and" or "or". The expression "in/output" corresponds with "input" and/or "output". The network-unit does not necessarily correspond with a unit to be sold, but may correspond with just a part of such a unit at least comprising one or more processors. So, the network-unit being a Base Station or Node B is just an example, and may in practice be smaller or larger. Each bus is just an example and may be replaced by separate connections, possibly coupled to multiplexers and demultiplexers. All figures are just embodiments, for example in FIG. 1 a unidirectional embodiment has been shown, but when making said Translators bidirectional, all inputs and outputs become in/outputs and the entire network-unit will become birectional. Processors 30-35 having three in/outputs may be realised by processors having one in/output and an internal bus coupled to the three in/outputs. Processors 36 and 37 generally each will have two in/outputs, but may be realised by processors having one in/output and an internal bus coupled to the two in/outputs, etc. Each one of said processors may be a processor system further comprising a memory, and buffers 20-25 may be memories of whatever kind, like Dual Ported RAMs having a serial in/output and a parallel in/output, or may be line interface units for serial/parallel conversions and general buffering. The Translators for example comprise amplifiers for amplifying or not in dependence of the input signal exceeding a threshold or not. In the telecommunication system at least one network-unit will need to be a sender for creating packets and packet signals. Thereto, for example processor 37 generally taking care of the higher layers (layer 4 to layer 7) will need a memory like a table memory or a database for creating new packets and packet signals.

The invention claimed is:

1. Network-unit for use in a telecommunication network and comprising at least one input for receiving a signal comprising a first field which is directly analysable and a second field which is analysable after a processing,
a first analyser coupled to said at least one input for analysing first information originating from said first field,
a processor for performing said processing of second information originating from said second field, and
a second analyser coupled to said processor for analysing processed second information,
at least one output for sending a further signal to a further network-unit and comprising a third field which is directly analysable and a fourth field which is analysable after a processing in said further network-unit,
wherein said first analyser is coupled to said processor for, in dependence of an analysis result of said first information, selecting at least one output and switching at least a part of said signal to said selected output or performing said processing, with said first information comprising non-address information, and with said second information comprising address information defining further network-units;
wherein said first field comprises a quality field for indicating a quality, with said second field comprising an IP-address field for indicating an IP-address;
wherein at least a part of said quality field is used for indicating a destination of said signal and a detection of this indication of said destination is said analysis result; and
wherein said first field comprises a layer 2 header and wherein said second field comprises a layer 3 header.

2. Network-unit according to claim 1, wherein the network-unit further comprises
a first generator coupled to said at least one output for generating said third information, and
a second generator coupled to said at least one output for generating said fourth information.

3. Network-unit according to claim 1, wherein said processing corresponds with defragmentation, decompression, demultiplexing and/or table consultation.

4. The network-unit according to claim 1, wherein said first field comprises a plurality of subfields, wherein one of the plurality of subfields comprises the first information.

5. The network-unit according to claim 1, wherein said first field is the first occurring field among a plurality of fields of a packet of the signal.

6. The network unit according to claim 1, wherein said first information comprises an indication of a relevance of the second information.

7. The network unit according to claim 1, wherein the further signal is an output signal of the network unit which is sent to a second network unit.

8. Telecommunication network comprising several network-units, at least a first network-unit comprising
at least one input for receiving a signal comprising a first field which is directly analysable and a second field which is analysable after a processing,
a first analyser coupled to said at least one input for analysing first information originating from said first field,
a processor for performing said processing of second information originating from said second field, and
a second analyser coupled to said processor for analysing processed second information,
at least one output for sending a further signal to a second network-unit and comprising a third field which is directly analysable and a fourth field which is analysable after a processing in said second network-unit,
wherein said first analyser is coupled to said processor for, in dependence of an analysis result of said first information, selecting at least one output and switching at least a part of said signal to said selected output or performing said processing, with said first information comprising non-address information, and with said second information comprising address information defining said second network-unit; and
wherein said first field comprises a layer 2 header and wherein said second field comprises a layer 3 header.

9. Telecommunication network according to claim 8, wherein the first network-unit further comprises
a first generator coupled to said at least one output for generating said third information, and
a second generator coupled to said at least one output for generating said fourth information.

10. Method for dealing with signals and comprising the steps of
receiving a signal comprising a first field which is directly analysable and a second field which is analysable after a processing,
analysing first information originating from said first field,
performing said processing of second information originating from said second field, and
analysing processed second information,
sending a further signal to a further network-unit and comprising a third field which is directly analysable and a fourth field which is analysable after a processing in said further network-unit,
wherein said method comprises the steps of, in dependence of an analysis result of said first information, selecting at least one output and switching at least a part of said signal to said selected output or performing said processing, with said first information comprising non-address information, and with said second information comprising address information defining further network-units;
wherein said first field comprises a quality field for indicating a quality, with said second field comprising an IP-address field for indicating an IP-address;
wherein at least a part of said quality field is used for indicating a destination of said signal and a detection of this indication of said destination is said analysis result; and
wherein said first field comprises a layer 2 header and wherein said second field comprises a layer 3 header.

11. Method according to claim 10, wherein the method comprises the steps of
generating said third information, and
generating said fourth information.

12. Method according to claim 10, wherein said processing corresponds with defragmentation, decompression, demultiplexing and/or table consultation.

* * * * *